United States Patent [19]

Baer

[11] Patent Number: 4,505,255
[45] Date of Patent: Mar. 19, 1985

[54] SUMMER/WINTER SOLAR CONTROL SYSTEM

[75] Inventor: Stephen C. Baer, Albuquerque, N. Mex.

[73] Assignee: Zomeworks Corporation, Albuquerque, N. Mex.

[21] Appl. No.: 550,710

[22] Filed: Nov. 14, 1983

[51] Int. Cl.³ .................. F24J 3/02; E05F 15/20
[52] U.S. Cl. .................. 126/419; 126/425; 49/25; 49/74
[58] Field of Search ............ 126/419, 425, 424; 49/74, 25

[56] References Cited

U.S. PATENT DOCUMENTS

| | | | |
|---|---|---|---|
| 3,121,265 | 2/1964 | Hoh | 49/25 |
| 3,884,414 | 5/1975 | Baer | 126/425 |
| 4,054,125 | 10/1977 | Eckels | 126/424 |
| 4,185,615 | 1/1980 | Bottum | 126/424 |
| 4,220,137 | 9/1980 | Tesch | 126/439 |
| 4,279,240 | 7/1981 | Artusy | 126/419 |
| 4,349,011 | 9/1982 | Hartsog | 126/419 |
| 4,449,563 | 5/1984 | Toda | 49/74 |

*Primary Examiner*—Samuel Scott
*Assistant Examiner*—G. Anderson
*Attorney, Agent, or Firm*—Townsend and Townsend

[57] ABSTRACT

A solar actuated louver system which provides shade in the summer but typically maximizes solar heating in the winter is disclosed. A plurality of overlapping, interconnected louvers pivot about parallel axes. A solar tracker has a frame which pivots between fixed stops. The tracker typically includes a pair of alternative tracking modes, a winter mode in which the frame is oriented toward the sun, and a summer mode in which the frame is oriented away from the sun. A counterweight is attached to the frame, and is adjustable between a summer position in which the center of gravity is above the pivotable axis of the frame, and a winter position in which the center of gravity is below the pivotable axis. The louvers are linked to the frame so that the louvers remain perpendicular to the frame.

13 Claims, 10 Drawing Figures

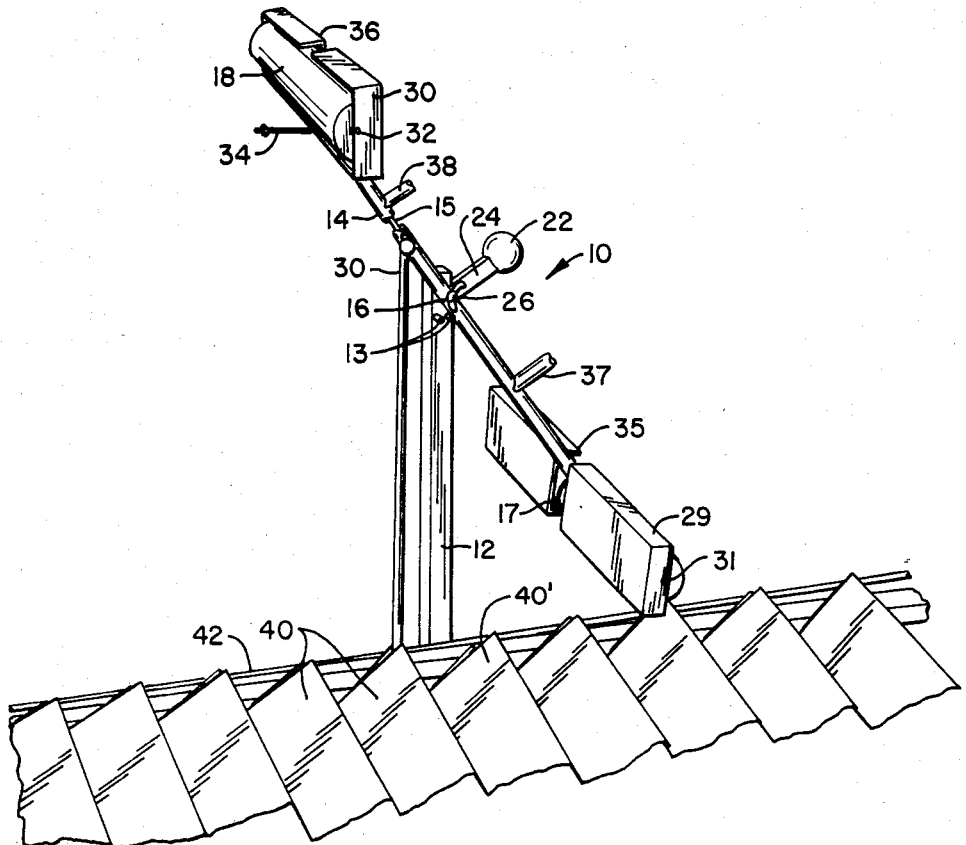
FIG._1.
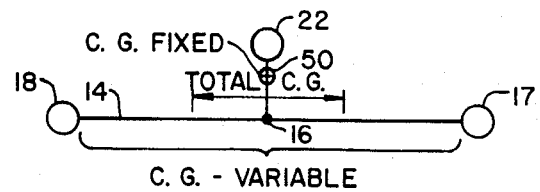
FIG._6.
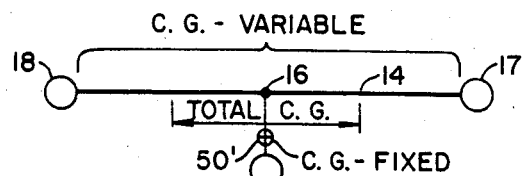
FIG._7.

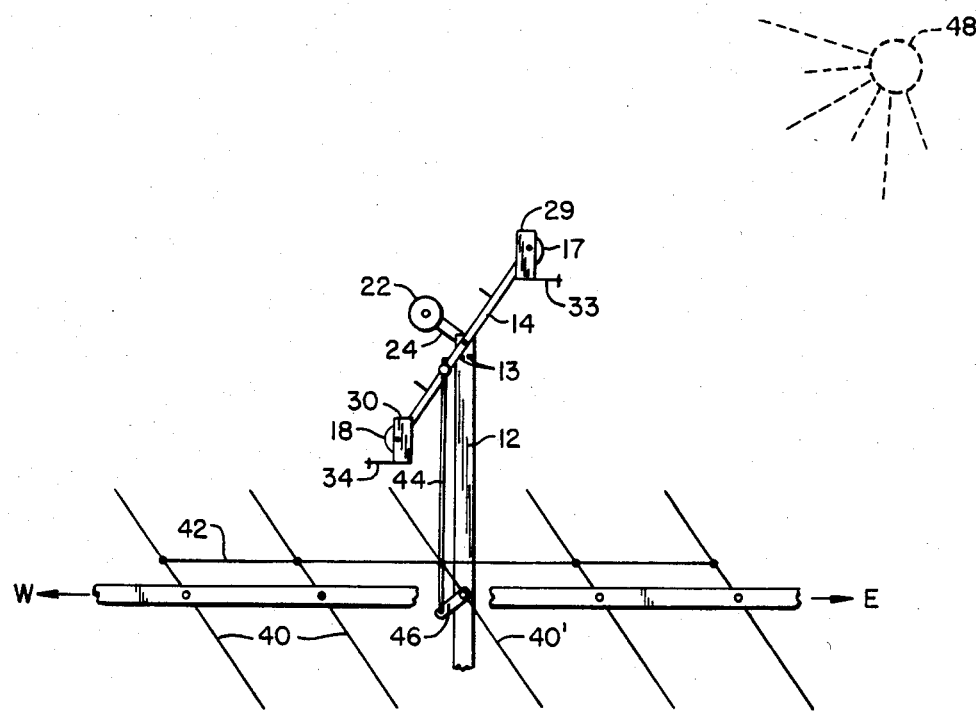
FIG._2.
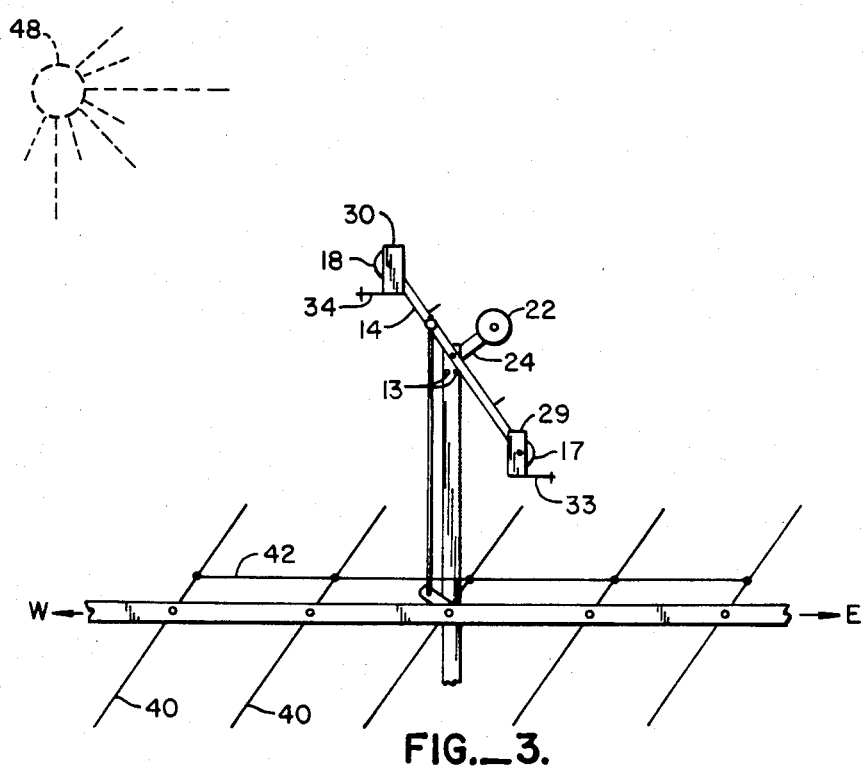
FIG._3.

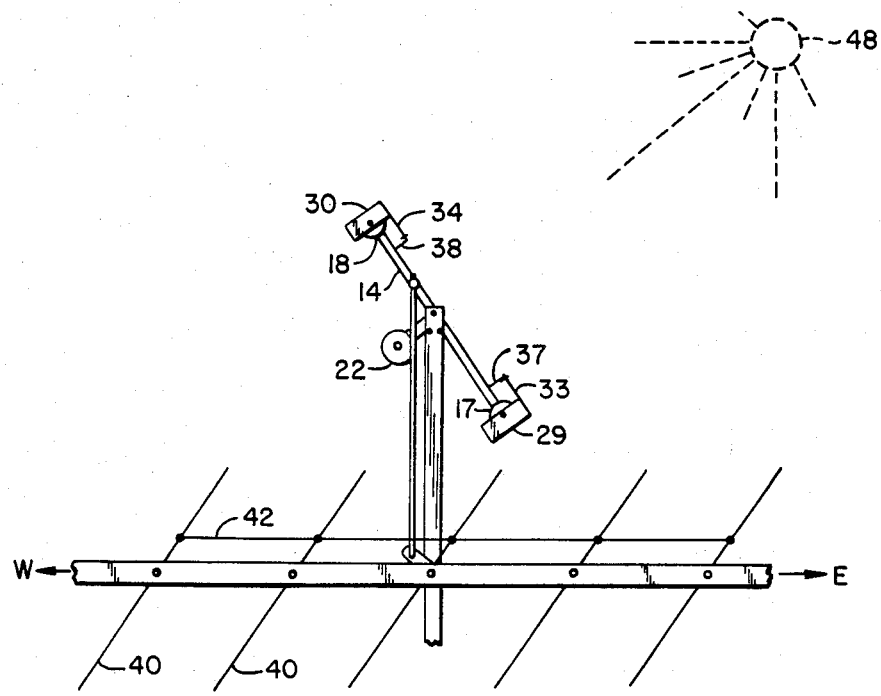
FIG._4.
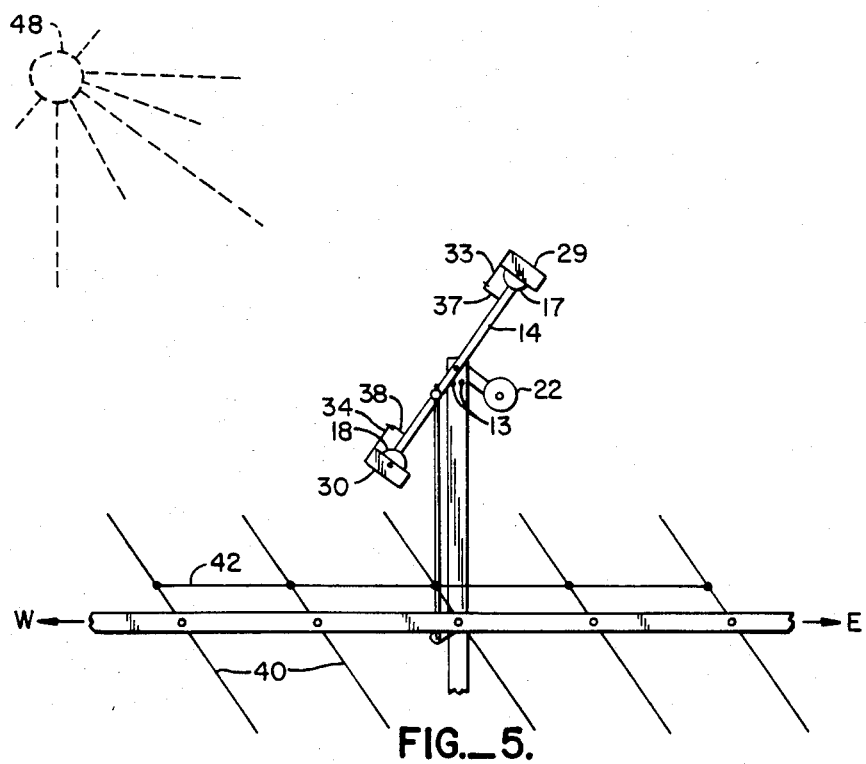
FIG._5.

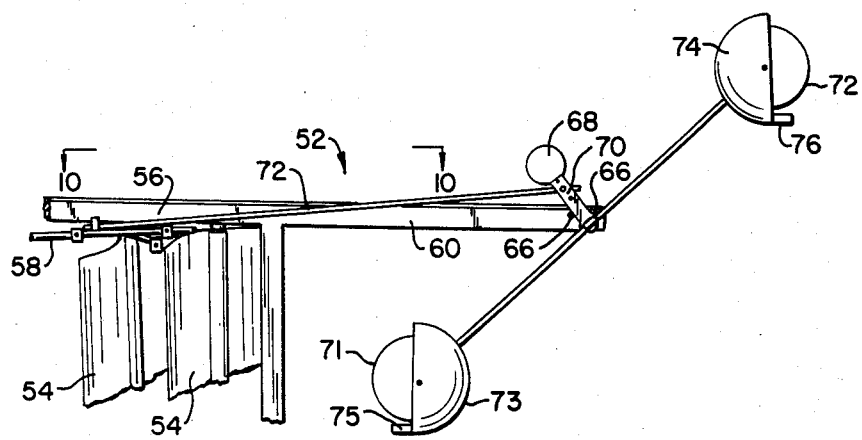
FIG._8.
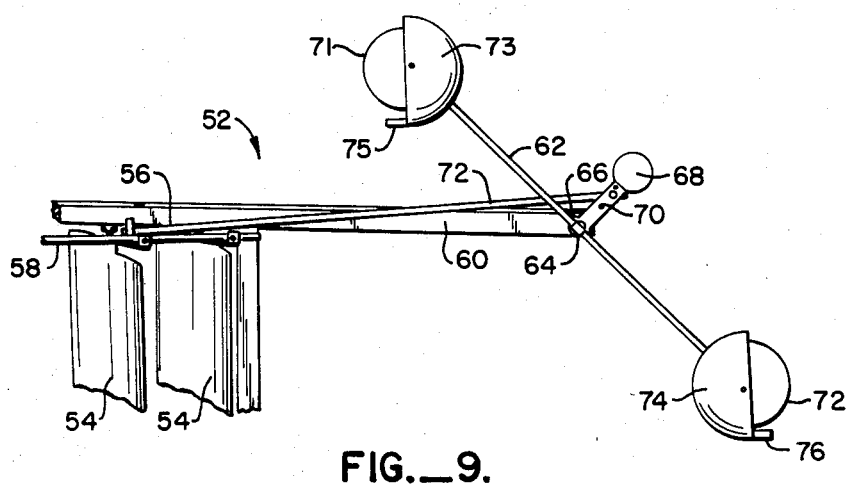
FIG._9.
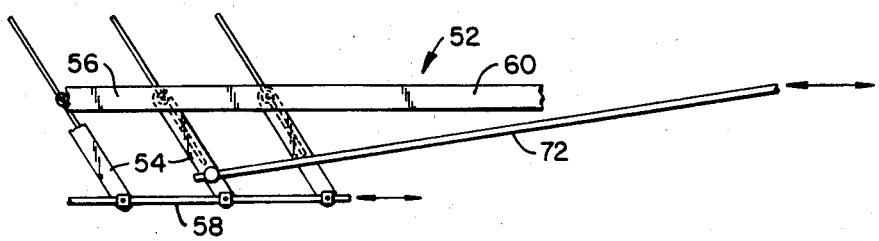
FIG._10.

SUMMER/WINTER SOLAR CONTROL SYSTEM

BACKGROUND OF THE INVENTION

The present invention relates to mechanisms for controlling the passage of solar radiation to maximize solar gain in winter and provide shade in summer.

A wide variety of devices have been developed with the objective of increasing the utilization of solar energy in housing and other structures. In the summer, it is generally desirable to shade the structure to reduce solar energy input, thereby decreasing the requirement for air conditioning, which generally relies on fossil fuel resources either directly or indirectly. In winter, the goal is to achieve direct solar input into the interior of the structure, maximizing the heat input and reducing heating requirements, which again generally rely on fossil fuel resources either directly or indirectly.

Most devices for increasing solar energy utilization in building structures are directed solely to either summer or winter usage. In other seasons of the year, the system must contain some sort of mechanism for rendering it nonfunctional. For example, a structure may be designed with a large window area and considerable inside thermal storage to maximize solar energy utilization during the winter—but in summertime, the windows must be provided with a shade so that the structure does not become overheated and require excessive air conditioning. As a second example, louver systems have been designed which block direct sunlight to provide shade in the summer, but in the winter such shading is undesirable. There has been a significant dearth of systems which are efficient controllers of solar energy both in the summer and in the winter.

SUMMARY OF THE INVENTION

The present invention discloses a solar actuated louver system which provides shade in the summer but typically maximizes solar heating in the winter. A plurality of overlapping, interconnected louvers pivot about parallel axes. A solar tracker has a frame which pivots between fixed stops. The tracker typically includes a pair of alternative tracking modes, a winter mode in which the frame is oriented toward the sun, and a summer mode in which the frame is oriented away from the sun. A counterweight is attached to the frame, and is adjustable between a summer position in which the center of gravity is above the pivotable axis of the frame, and a winter position in which the center of gravity is below the pivotable axis. The louvers are linked to the frame so that the louvers remain perpendicular to the frame.

In the system described above, in the winter mode the frame is stable and will track the sun during the day between the fixed stops. However, in the summer mode, the frame is bistable against the stops. As a result, in the winter the frame will be oriented toward the sun and the louvers, which are perpendicular to the frame, will be edgewise to the sunlight, allowing the sunlight to pass between the louvers. In summer, the flat side of the louvers will be directed at the sun, changing position at midday, and because the louvers overlap, direct solar throughput will be eliminated.

The alternate tracking modes of the present invention are achieved by utilizing a solar tracker which includes interconnected cannisters on the east and west ends of the frame containing a volatile fluid, and shadow bars which partially surround the respective cannisters. The shadow bars are adjustable, and in the winter mode the shadow bars point inwardly so that the near cannister is shaded more than the far cannister when the rays of the sun are not normal to the frame. (Throughout this application, the term "near cannister" is used to designate the cannister on the side of the frame nearest the sun, and "far cannister" is used to designate the cannister on the side of the frame furthest from the sun.) In the summer mode, the shadow bars are adjusted to point outwardly so that the near cannister is exposed to the sun and the far cannister is shaded from the sun when the sun is not directly overhead. To optimize the operation of the system, the position of the shadow bars relative to the frame is fixed during the winter mode, and movable in the summer mode. The shadow bars include counterweights to maintain the shadow bars in the proper vertical orientation during the summer mode.

In the summer, direct sunlight is blocked to prevent heating of the inside of the structure by direct solar radiation, minimizing the necessity for air conditioning. In the winter, the desired solar throughput is maximized to heat the interior of the structure. Accordingly, the apparatus of the present invention provides an efficient environmental control system both in summer and winter.

In an alternative embodiment of the present invention, designed primarily for vertically mounted louvers, the system operates only in the summer mode. The shadow bars point outwardly and are balanced so that the near cannister is exposed to the sun and the far cannister is shaded from the sun when the sun is not directly overhead. A counterweight is located above the pivotal axis, rendering the system bistable. The louvers are linked to the frame so that direct sunlight is prevented from passing between the louvers at all times.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a preferred embodiment of the present invention;

FIG. 2 is a schematic elevation view of the embodiment of FIG. 1 in the summer mode in its morning configuration;

FIG. 3 is a schematic elevation view of the embodiment of FIG. 1 in the summer mode in its afternoon configuration;

FIG. 4 is a schematic elevation view of the embodiment of FIG. 1 in the winter mode in the morning;

FIG. 5 is a schematic elevation view of the embodiment of FIG. 1 in the winter mode in the afternoon;

FIG. 6 is a schematic depiction of the center of gravity movement of the apparatus in the summer mode;

FIG. 7 is a schematic depiction of the center of gravity movement of the apparatus in the winter mode.

FIG. 8 is a perspective view of an alternate embodiment of the present invention in its morning configuration;

FIG. 9 is a view similar to that of FIG. 8 illustrating the afternoon configuration of the alternative embodiment;

FIG. 10 is a plan view of the embodiment of FIG. 8.

DESCRIPTION OF THE PREFERRED EMBODIMENTS

A preferred embodiment 10 of the summer/winter solar tracking system of the present invention is illustrated generally by way of reference to FIG. 1. A fixed post 12 supports a frame 14 which is pivotable about a pin 16 about a horizontal (often but not necessarily north/south) axis. Pivoting of frame 14 is limited to ±55° from vertical by stops 13. A pair of cannisters 17, 18 are mounted at the east and west ends respectively of frame 14, and are connected by a conduit 15 internal to frame 14. A counterweight 22 on armature 24 is fixed to frame 14 by loosening wing nut 26. Counterweight 22 can be adjusted by wing nut 26 and rotating armature 24.

Shadow bars 29, 30, are pivotably mounted to cannisters 17, 18 by pin connections 31, 32 so that the shadow bars are rotatable relative to the cannisters. Shadow bars 29, 30 partially surround the respective cannisters, shading them from sunlight through an arc of approximately 180°. Adjustable counterweights 33, 34 emanate from east and west shadow bars 29, 30 respectively.

Shadow bars 29, 30 are provided with central slots 35, 36. Slots 35, 36 allow a certain amount of rotation of shadow bars 29, 30 with respect to cannisters 17, 18, and also allow the shadow bars to be rotated inwardly, east shadow bar 29 being rotated counterclockwise and west shadow bar 30 being rotated clockwise, until the counterweights 33, 34 engage tabs 37, 38 to which the counterweights can be attached by nuts (not shown). As will be described in more detail hereinafter, this latter inward position of the shadow bars, in which they are fixed and point inwardly, represents the winter mode of the system. The summer mode is that illustrated in FIG. 1, with the shadow bars rotatable and balanced by counterweights 33, 34 to maintain their vertical orientation, pointing outwardly.

A plurality of louvers 40 are located at the base of post 12, and are pivotable about parallel axes. Louvers 40 are connected by a link 42 so that the louvers pivot in unison. A rod 44 depends from frame 14 at a position spaced from pivot point 16, and is connected to center louver 40' by link 46. Referring briefly to FIG. 2, post 12, frame 14, rod 44 and link 46 form a parallelogram structure which maintains frame 14 perpendicular to louvers 40 at all times.

Operation of the apparatus of the present invention in its summer mode is illustrated by way of reference to FIGS. 2 and 3, representing morning and afternoon configurations of the system respectively. Directions are indicated by the arrows labeled "E" for east and "W" for west. In the morning, with sun 48 in the eastern sky, east cannister 17 is heated, while west cannister 18 is shaded from direct sunlight by west shadow bar 30. As a result, the volatile fluid in east cannister 17, typically R-12 or R-22, will be heated, raising its vapor pressure and forcing the liquid content of the volatile fluid into west cannister 18. Cannister 18 with the liquid volatile fluid is heavier than cannister 17, and frame 14 will rotate to the west against west stop 13, as indicated in FIG. 2. Since louvers 40 are maintained perpendicular to frame 14 by rod 44 and link 46, the louvers will be inclined westwardly 45° from vertical, shading the area beneath the louvers from sun 48 in the eastern sky.

After midday, when the sun has passed overhead and is now in the western sky, as illustrated in FIG. 3, east cannister 17 is shaded by shadow bar 29, while west cannister 18 is exposed. West cannister 18 will thus be heated, raising the vapor pressure of the volatile fluid, and forcing the fluid through conduit 15 to east cannister 17. When sufficient liquid volatile fluid has been transferred to east cannister 17, frame 14 will tilt eastwardly against east stop 13. Rod 44 and link 46 move upwardly, rotating louvers 40 to a position inclined 45° to the east, and once again direct sunlight cannot pass between louvers 44. Thus, the space beneath louvers 40 will be exposed to sunlight only for a brief period as the louvers rotate, while providing continuous ventilation to the area beneath the louvers at all times during the day.

The winter mode of the apparatus 10 of the present invention is illustrated by way of reference to FIGS. 4 and 5 in combination. Turning first to FIG. 4, the situation in the morning is illustrated with sun 48 in the eastern sky. Shadow bars 29, 30 have been rotated until counterweights 33, 34 contact tabs 37, 38 to which the counterweights are secured so that the shadow bars point directly inwardly toward the pin 16 about which frame 14 rotates. Counterweight 22 has also been adjusted so that it is now below frame 14.

When sun 48 has risen to the point that it is less than 45° east of vertical, continued westward movement of the sun will cause east cannister 17 to be heated more than west cannister 18. As a result of this temperature imbalance, the vapor pressure of the volatile fluid in cannister 17 will exceed the vapor pressure in cannister 18, forcing liquid volatile fluid from the east cannister to the west cannister, and causing the frame to tilt westwardly. Because any overshoot will result in cannister 18 being heated more than cannister 17, frame 14 will follow the sun, with equal sunlight falling on cannister 17 and 18, with slightly more sun falling on east cannister 17 because of a time lag in the dynamics of the system. Since louvers 40 are maintained perpendicular to frame 14, the louvers will be parallel to the rays of sun 48, which will pass between the louvers to heat the area beneath them.

As illustrated in FIG. 5, frame 14 continues to follow sun 48 in the afternoon. This situation will pertain until frame 14 hits west stop 13. Thus, louvers 40 will be maintained perpendicular to the sun, allowing maximum solar throughput, at all times while the sun is within 45 degrees of vertical.

Of critical importance to the apparatus of the present invention is the manner in which movement of the center of gravity is controlled. In FIG. 6, a schematic depiction is made of the center of gravity movement of the apparatus in the summer mode, when counterweight 22 is located above frame 14. The center of gravity 50 of the fixed elements of the system, including counterweight 22, frame 14, cannisters 29, 30 and associated hardware, will lie along the line drawn between the pivot point 16 and counterweight 22. Because the volatile fluid moves between east cannister 17 and west cannister 18, there is a variable center of gravity position extending between the two cannisters fixed along frame 14. At any given time, the actual center of gravity of the system will lie along a locus designated "total c.g." in FIG. 6. In the summer mode, this center of gravity lies above pivot point 16, resulting in an unstable system in which frame 14 will always be rotated against one of the stops, either left or right. Thus, in the system described above, in the summer mode the louvers will either be rotated to the right (FIG. 2) or rotated to the left (FIG. 3).

Center of gravity movement in the winter mode is illustrated by way of reference to FIG. 7. In this mode, counterweight 22 is located below frame 14, so that the center of gravity 50' of the fixed elements of the system is located below pivot point 16. The variable center of gravity again traverses the length of frame 14, so that the locus of center of gravity positions, designated "total c.g.", lies below pivot point 16. This results in a stable system, allowing frame 14 to be oriented directly at the sun at all times (between the fixed stops) as described hereinabove.

In operation, the winter or summer mode of the system will be established by the user by adjusting shadow bars 29, 30 and counterweight 22. In the summer mode, counterweight 22 is placed above frame 14, and shadow bars 29, 30 are balanced using counterweights 33, 34 so that they maintain their vertical orientation. In the winter, counterweight 22 is shifted to a position below frame 14, and the shadow bars are rotated inwardly and counterweights 33, 34 are fixed to tabs 37, 38. Thus, solar shading with a maximum of convective cooling is achieved in the summer, and maximum of solar throughput is achieved in the winter, by making only minor adjustments to the system of the present invention.

Alternative embodiment 52 of the present invention is illustrated by way of reference to FIGS. 8–10 in combination. In the alternative embodiment, a plurality of vertically mounted louvers 54 are supported by a frame 56, and interconnected by rod 58 so that the louvers move in unison about parallel vertical axes. Frame 56 includes an armature 60 to which a frame 62 is pivotably mounted by pin 64. Typically, frame 62 will rotate about a generally horizontal axis. A pair of stops 66 limit the pivotal motion of frame 62.

A counterweight 68 is located at the distal end of armature 70, so that the center of gravity of frame 62, counterweight 68 and their associated moving equipment lies above pin 64. A rod 72 interconnects armature 70 and one of the louvers 54 so that movement of the armature between stop 66 moves the louvers between fixed, overlapping positions.

Spherical cannisters 71, 72 are located at the opposite ends of frame 62. Cannisters 71, 72 are interconnected by a conduit passing through the interior of frame 62, which is coupled to the respective conduits at their low point. A volatile fluid is located in cannisters 71, 72 and the conduit, in the fashion described previously. Shadow bars 73, 74 in the shape of hemispheres are pivotably mounted to cannisters 71, 72, and have counterweights 75, 76 which maintain the shadow bars in a vertical configuration. In essence, the alternative embodiment is permanently configured in the summer mode described previously.

Looking at FIGS. 8 and 9 and considering south to be in front of the paper and north to be behind the paper, the sun rises from the right of the drawings, representing East. FIGS. 8 shows the configuration of the system during the morning, with east cannister 72 heated to drive the volatile fluid into west cannister 71, increasing the weight of west cannister 71 to pivot it downwardly, in which configuration louvers 54 block the morning sun. This situation pertains until the sun passes its midpoint and begins to heat west cannister 71 more than east cannister 72, transferring the liquid portion of the volatile fluid to the east cannister so that it becomes heavier and the system moves to the afternoon configuration represented by FIG. 9. In this configuration, louvers 54 are rotated to block the afternoon sun.

While preferred embodiments of the present invention have been illustrated in detail, it is apparent that modifications and adaptations of those embodiments will occur to those skilled in the art. However, it is to be expressly understood that such modifications and adaptations are with the spirit and scope of the present invention, as set forth in the following claims:

What is claimed is:

1. A solar actuated louver system for providing shade in the summer and maximizing solar heating in the winter, said system comprising:
   a plurality of overlapping, interconnected louvers pivotable about parallel axes;
   a solar tracker having a frame pivotable between fixed stops, said tracker including a pair of alternative tracking modes, a winter mode in which the frame is oriented toward the sun, and a summer mode in which the frame is oriented away from the sun;
   a counterweight attached to the frame and adjustable between a winter position which puts the center of gravity of the tracker and counterweight below the pivotal axis of the frame to stabilize the frame when the frame is oriented toward the sun, and a summer position which puts the center of gravity of the tracker and counterweight above the pivotal axis of the frame to render the frame bistable against either stop when the frame is oriented away from the sun; and
   means for linking the louvers to the frame so that direct sunlight passes between the louvers in the winter mode and is blocked by the louvers in the summer mode.

2. The system of claim 1 wherein the solar tracker includes interconnected cannisters on the respective ends of the frame respectively containing a volatile fluid, and shadow bars partially surrounding the respective cannisters, said shadow bars being adjustable between a winter position in which the shadow bars point inwardly so that the near cannister is shaded more than the far cannister when the rays of the sun are not normal to the frame, and a summer position in which the shadow bars point outwardly so that the near cannister is exposed to the sun and the far cannister is shaded from the sun when the sun is not directly overhead.

3. The system of claim 2 wherein the position of the shadow bars relative to the frame is fixed during the winter mode, and movable in the summer mode.

4. The system of claim 3 wherein the shadow bars include counterweights to maintain the shadow bars in the proper vertical orientation in the summer mode.

5. A solar actuated louver system for providing shade in the summer and maximizing solar heating in the winter, said system comprising:
   a plurality of overlapping, interconnected louvers pivotable about parallel axes;
   a frame pivotable between fixed stops;
   a pair of cannisters on the respective distal ends of the frame;
   means for interconnecting the cannisters;
   a volatile fluid contained within the cannisters and the interconnecting means;

a pair of shadow bars partially surrounding the respective cannisters, said shadow bars being adjustable between the winter mode in which the rotatable position of the shadow bars is fixed and the shadow bars point inwardly so that the near cannister is shaded more than the far cannister when the rays of the sun are not normal to the frame, and a summer mode in which the shadow bars are rotatable and balanced to point outwardly so that the near cannister is exposed to the sun and the far cannister is shaded from the sun when the sun is not directly overhead, so that the frame is directed toward the sun in the winter mode and away from the sun in the summer mode;

a counterweight attached to the frame and adjustable between a winter position which puts the center of gravity of the tracker and counterweight below the pivotal axis of the frame to stabilize the frame when the frame is oriented towards the sun, and a summer position which puts the center of gravity of the tracker and counterweight above the pivotal axis of the frame to render the frame bistable against either stop when the frame is oriented away from the sun; and means for linking the louvers to the frame so that direct sunlight passes between the louvers in the winter mode and is blocked by the louvers in the summer mode.

6. The system of claim 1 or 5 wherein the linking means includes a parallelogram linkage maintaining the louvers perpendicular to the frame.

7. The system of claim 1 or 5 wherein the counterweight includes a weight at the end of an armature, and means for pivotably attaching the end of the armature remote from the weight to the frame at the pivotal axis of the frame, said attachment being adjustable to move the counterweight between positions above and below the frame respectively.

8. The system of claim 1 or 5 wherein the louvers and frame pivot about substantially north/south axes.

9. A solar tracking system having a summer mode and a winter mode, said system comprising:
a frame pivotable between fixed stops;
a pair of cannisters on the respective distal ends of the frame;
means for interconnecting the east and west cannisters;
a volatile fluid contained in the east and west cannister and the conduit;
a pair of shadow bars partially surrounding the respective cannisters, said shadow bars being adjustable between a winter position in which the rotatable position of the shadow bars is fixed and the shadow bars point inwardly so that the near cannister is shaded more than the far cannister when the rays of the sun are not normal to the frame, and a summer position in which the shadow bars are rotatable and balanced to point outwardly so that the near cannister is exposed to the sun and the far cannister is shaded from the sun when the sun is not directly overhead, so that the frame is directed toward the sun in the winter mode and away from the sun in the summer mode; and a counterweight attached to the frame and adjustable between a winter position which puts the center of gravity of the tracker and counterweight below the pivotal axis of the frame to stabilize the frame when the frame is oriented towards the sun, and a summer position which puts the center of gravity of the tracker and counterweight above the pivotal axis of the frame to render the frame bistable against either stop when the frame is oriented away from the sun.

10. The system of claim 9 and additionally comprising a plurality of overlapping, interconnected louvers pivotable about parallel, substantially north/south axes; and means for linking the louvers to the frame so that the louvers are perpendicular to the frame whereby sunlight passes between the louvers in the winter mode and is blocked by the louvers in the summer mode.

11. A solar actuated louver system providing shade in the summer, said system comprising:
a plurality of overlapping, interconnecting louvers pivotable about parallel axes;
a solar tracker having a frame pivotable between fixed stops, a pair of interconnected cannisters at the respective distal ends of the frame, means for connecting the cannisters, a volatile fluid contained within the cannisters and the interconnecting means, and a pair of shadow bars partially surrounding the respective cannisters, the shadow bars being rotatable and balanced to point outwardly so that the near cannister is exposed to the sun and the far cannister is shaded from sun when the sun is not directly overhead;
a counterweight attached to the frame so that the center of gravity of the frame is above its pivotal axis to render the frame bistable against either stop; and
means for linking the louvers to the frame so that the louvers pivot with the frame to block direct sunlight from passing through the louvers at all times.

12. The system of claim 11 wherein the louvers pivot about a generally vertical axis, and wherein the frame pivots about a horizontal axis.

13. The system of claim 2, 5, 9 or 11 wherein the volatile fluid is selected from the group consisting of R-12 and R-22.

* * * * *